(12) United States Patent
Masters et al.

(10) Patent No.: US 9,551,627 B2
(45) Date of Patent: Jan. 24, 2017

(54) DYNAMIC WIND VELOCITY AND PRESSURE SIMULATOR

(75) Inventors: Forrest James Masters, Gainesville, FL (US); Henry L. Upjohn, II, Kalamazoo, MI (US); Kenneth R. Bowditch, Paw Paw, MI (US); James Paul Jesteadt, Palm Beach Gardens, FL (US); Yan Shen, Gainesville, FL (US); Cedric Adam, Gainesville, FL (US); Bob Nicholson, Birmingham, MI (US)

(73) Assignees: UNIVERSITY OF FLORIDA RESEARCH FOUNDATION, INC., Gainesville, FL (US); SPECIAL-LITE, INC., Decatur, MI (US)

( * ) Notice: Subject to any disclaimer, the term of this patent is extended or adjusted under 35 U.S.C. 154(b) by 721 days.

(21) Appl. No.: 13/617,466

(22) Filed: Sep. 14, 2012

(65) Prior Publication Data
US 2013/0068045 A1    Mar. 21, 2013

Related U.S. Application Data

(60) Provisional application No. 61/535,103, filed on Sep. 15, 2011.

(51) Int. Cl.
*G01N 17/00* (2006.01)
*G01M 9/04* (2006.01)

(52) U.S. Cl.
CPC ..................... *G01M 9/04* (2013.01)

(58) Field of Classification Search
CPC .................................................. G01N 17/00
USPC ................................ 73/147, 865.6; 239/502
See application file for complete search history.

(56) References Cited

U.S. PATENT DOCUMENTS

| | | | | |
|---|---|---|---|---|
| 3,005,339 A | * | 10/1961 | Loftin, Jr. ....................... | 73/147 |
| 3,301,164 A | * | 1/1967 | Eberhart ....................... | 454/319 |
| 3,357,231 A | * | 12/1967 | Till et al. ....................... | 73/1.29 |
| 3,552,202 A | * | 1/1971 | Kroeger et al. ................ | 73/147 |
| 4,241,647 A | * | 12/1980 | Herr .............................. | 454/336 |
| 4,750,355 A | * | 6/1988 | Urabe et al. .................. | 73/147 |
| 4,768,386 A | * | 9/1988 | Taddeo ....................... | 73/861.66 |

(Continued)

FOREIGN PATENT DOCUMENTS

JP    57179723 A   *   11/1982   ............ G01M 9/00

OTHER PUBLICATIONS

English Translation of JP 57179723 A, Nov. 1982.*

(Continued)

*Primary Examiner* — Peter Macchiarolo
*Assistant Examiner* — Alexander Mercado
(74) *Attorney, Agent, or Firm* — Thomas | Horstemeyer LLP; Christopher B. Linder; Randy R. Schoen (57) ABSTRACT

Various examples are provided for dynamic simulation of wind velocity and pressure. In one embodiment, among others, a dynamic wind simulator includes a fan and a fast-acting damper connected to an inlet of the fan. The fast-acting damper configured to modulate airflow provided by the fan at frequencies up to 10 Hz. In another embodiment, a system includes a fan and an air outlet path of the fan connected to a testing assembly configured to support a specimen for testing. An air inlet path of the fan includes a fast-acting damper configured to modulate airflow provided by the fan to the testing assembly at frequencies up to 10 Hz. The testing assembly may include a pressure chamber and/or a test section.

20 Claims, 13 Drawing Sheets

(56) References Cited

U.S. PATENT DOCUMENTS

| | | | |
|---|---|---|---|
| 4,799,390 A * | 1/1989 | Kimura | 73/865.6 |
| 4,950,388 A * | 8/1990 | Stafford | 209/135 |
| 5,035,359 A * | 7/1991 | Yamada et al. | 239/502 |
| 5,435,175 A * | 7/1995 | Kramer et al. | 73/147 |
| 5,495,754 A * | 3/1996 | Starr et al. | 73/147 |
| 6,155,111 A * | 12/2000 | Wickern et al. | 73/147 |
| 6,560,936 B2 * | 5/2003 | Satomi et al. | 52/174 |
| 6,705,937 B2 * | 3/2004 | Huang et al. | 454/49 |
| 6,725,912 B1 * | 4/2004 | Moll et al. | 165/144 |
| 7,237,434 B2 * | 7/2007 | Wilson et al. | 73/147 |
| 7,401,505 B1 * | 7/2008 | Schultz et al. | 73/147 |
| 7,966,873 B1 * | 6/2011 | Roos et al. | 73/147 |
| RE43,028 E * | 12/2011 | Kitchen et al. | 472/49 |
| 2003/0056580 A1 * | 3/2003 | Sawada et al. | 73/147 |
| 2004/0089065 A1 * | 5/2004 | Lacey, Jr. | 73/147 |
| 2005/0120788 A1 * | 6/2005 | Markstaller et al. | 73/147 |
| 2009/0277263 A1 * | 11/2009 | Petruk | 73/147 |
| 2010/0175465 A1 * | 7/2010 | Kato et al. | 73/147 |
| 2012/0144911 A1 * | 6/2012 | Moliere | 73/147 |
| 2014/0230577 A1 * | 8/2014 | Cakmak et al. | 73/863.11 |

OTHER PUBLICATIONS

Cook, N.J., Keevil, A.P. and Stobart, R.K. (Aug. 1988). "BRERWULF—The Big Bad Wolf," Journal of Wind Engineering and Industrial Aerodynamics, 29(1-3), 99-107.

Huang, P., Gan Chowdhury, A., Bitsuamlak G., & Liu. R. (Jan. 2009). Development of Devices and Methods for Simulation of Hurricane Winds in a Full-Scale Testing Facility. Wind and Structures, 12 (2), 151-177.

Kennedy, C.E. (Aug. 1999). Feasibility study for a full-scale wind test facility, Masters Thesis, Clemson University, Civil Engineering Department.

Kopp, G.A., Morrison M.J., Gavanski, E, Henderson, D.J., and Hong, H.P., (Dec. 2010). "The 'Three Little Pigs' Project: Hurricane Risk Mitigation by Integrated Wind Tunnel and Full-Scale Laboratory Tests," Natural Hazards Review, 11, 151-161.

National Research Council (Jan. 1999). "Review of the need for a large-scale test facility for research on the effects of extreme winds on structures," National Academy of Sciences, National Academy Press, Washington, D.C.

Kopp, G.A., (Dec. 2010). "The 'Three Little Pigs' Project: Integration of wind tunnel model scale tests with full-scale laboratory tests." Presentation Hurricane Risk Mitigation by Integrated Wind Tunnel and Full-Scale Laboratory Tests.

Baskaran, et al., A new Facility for Dynamic Wind Performance Evaluation of Roofing Systems, Proceedings of the Fourth International Symposium on Roofing Technology (Dec. 1997).

Jeasteadt, Wind Data Collection, Wind Resistance of Florida Residential Structures, and Simulation of Hurricane Force Winds: 2003 to 2006 Florida Coastal Monitoring Program (FCMP), A Thesis Presented to the Graduate School of the University of Florida in Partial Fulfillment of the Requirements for the Degree of Master of Engineering (Dec. 2006).

Chowdhury et al., Wall of Wind: Full Scale Hurricane Wind and Wind-Driven Rain Testing Facility, 11th Americas Conference on Wind Engineering, San Juan, Puerto Rico, Jun. 2009.

Smith, et. al., Validation of Facility Configuration and Investigation of Control Systems for the IBHS Windstorm Simulator, 11th Americas Conference on Wind Engineering, (Jun. 2009).

* cited by examiner

DYNAMIC WIND VELOCITY AND PRESSURE SIMULATOR

CROSS REFERENCE TO RELATED APPLICATIONS

This application claims priority to U.S. provisional application entitled "DYNAMIC WIND VELOCITY AND PRESSURE SIMULATOR" having Ser. No. 61/535,103, filed Sep. 15, 2011, the entirety of which is hereby incorporated by reference.

BACKGROUND

The effect of airflow and wind on objects has been studied for centuries. As early as the 1700s, aerodynamic testing has been carried out by controlling the airflow past a test object or model. By the late 1800s, wind tunnels were being utilized to provide a controllable airflow for experimental testing. Constant air speeds in the supersonic range were achieved by the mid-1900s. However, the ability to replicate testing with time varying airflows remains limited. In general, dynamic wind simulation is performed using numerical modeling and analysis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments related to a dynamic wind velocity and pressure simulator. The ability to recreate time-varying wind and wind loading conditions allows for the development and testing of improved building materials and designs that can withstand the conditions encountered during storms, tornadoes, and hurricanes. Reference will now be made in detail to the description of the embodiments as illustrated in the drawings, wherein like reference numbers indicate like parts throughout the several views.

Figure 1:
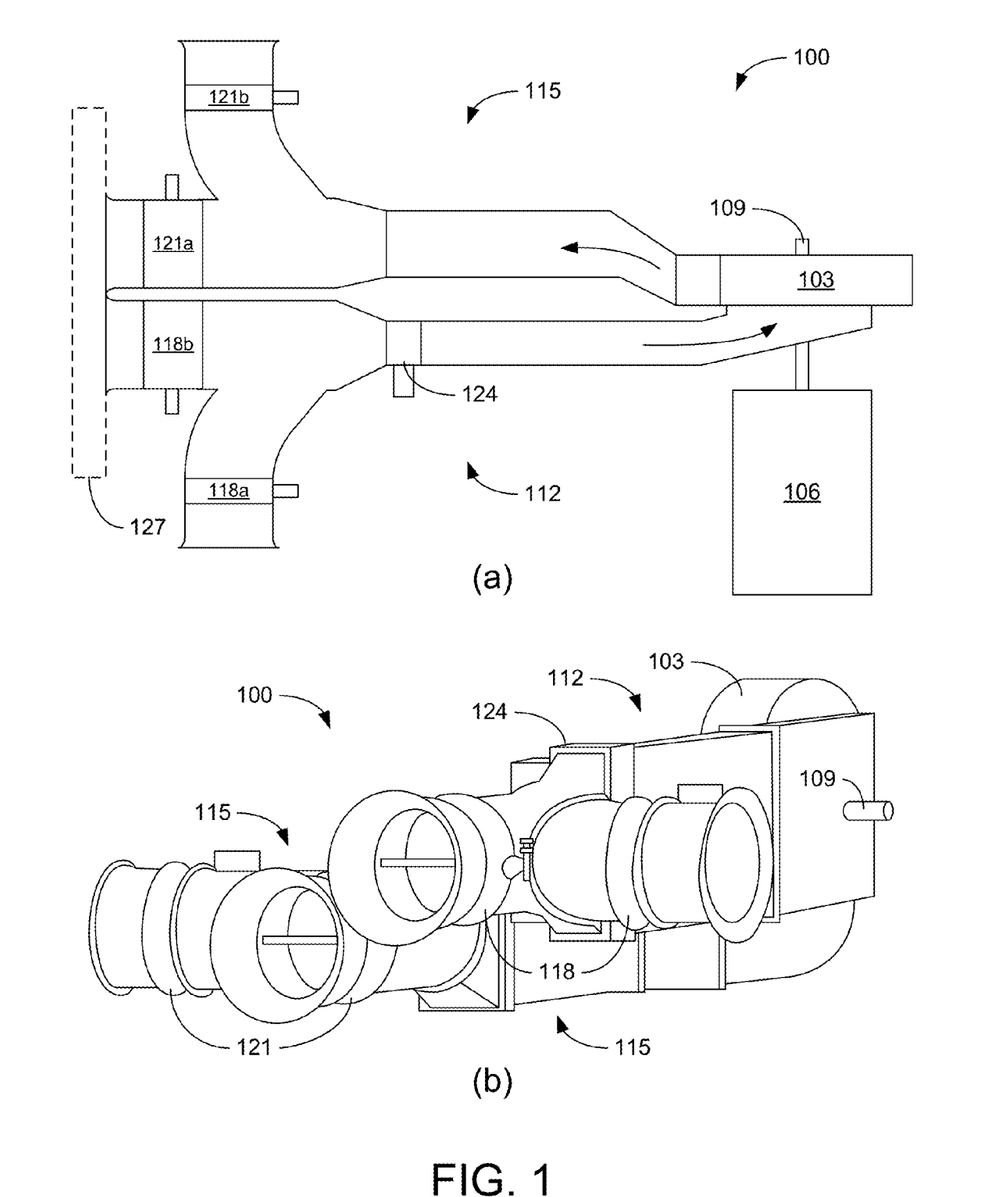
FIGS. 1 and 2 are graphical representations of an example of a dynamic wind simulator in accordance with various embodiments of the present disclosure.

Referring to FIG. 1, shown are graphical representations of (a) a top view and (b) a perspective view of an example of a dynamic wind simulator 100. The dynamic wind simulator 100 is configured to recreate time-varying wind (velocity and pressure) and wind load conditions such as those experienced during storms, tornadoes, and category 5 hurricanes. The dynamic wind simulator 100 includes a fan 103 such as, e.g., a centrifugal fan (e.g., Clarage model backward inclined centrifugal fan model no. SISW 5130 AF) driven by a prime mover 106 such as, e.g., an electric motor, diesel engine (e.g., Caterpillar 3512 DITA diesel prime mover rated for 1818 hp at 1800 rpm), or other appropriate prime mover as can be appreciated. The prime mover 106 may be coupled to the fan 103 by a driveline system including a torsional vibration control coupling (e.g., Renold model no. SAE 21 SM 60 RB 3.86) attached to a flywheel of the prime mover 106 that transfers power to a clutch (e.g., a 21 inch Wichita air clutch model 6-12-382-313-9), which engages a driveshaft 109 of the fan 103.

The dynamic wind simulator 100 also includes an air inlet path 112 and an air outlet path 115. In the example of FIG. 1, the air inlet path 112 includes two inlet dampers 118 such as, e.g., butterfly dampers (e.g., Mader Dampers A-100 Series) that may be controlled to adjust airflow into the air inlet path 112. The air outlet path 115 in the example of FIG. 1 includes two outlet dampers 121 such as, e.g., butterfly dampers (e.g., Mader Dampers A-100 Series) that may be controlled to adjust airflow from the air outlet path 115. The inlet dampers 118 (atmospheric inlet damper 118a and vacuum damper 118b) and outlet dampers 121 (pressure damper 121a and atmospheric exhaust damper 121b) can be used to set the mode of operation by changing the airflow configuration through the dynamic wind simulator 100. The air path ducting of the air inlet path 112 and the air outlet path 115 can be heavy gauge steel ducting with, e.g., a 0.375 inch thickness and a 60 inch inside diameter. The air inlet path 112 can also include a duct silencer (e.g., VAW inlet duct silence model no. VRIB) which may reduce noise by 20 dBA or more. Similarly, the air outlet path 115 can also include a duct silencer (e.g., VAW outlet duct silence model no. VRDS) which may reduce noise by 20 dBA or more.

Figure 2:
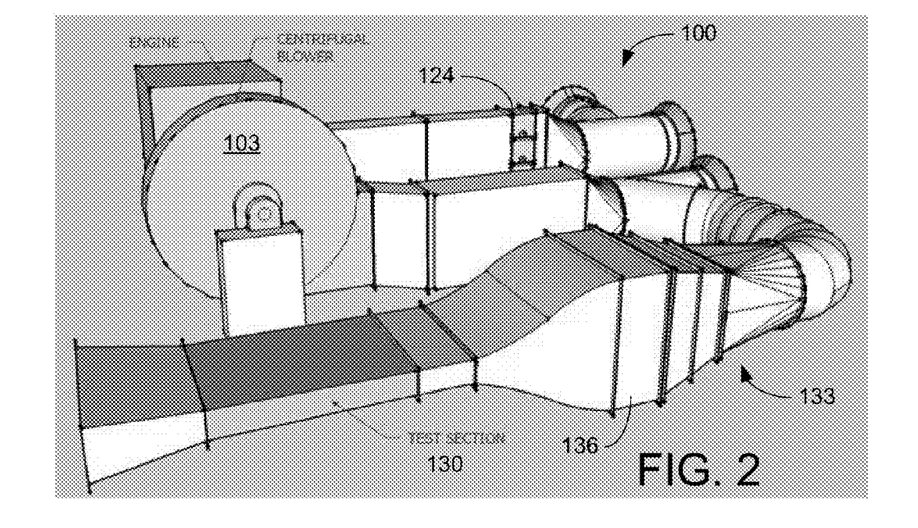

The air inlet path 112 also includes a fast-acting damper 124 located upstream of the fan 103. The fast-acting damper 124 functions to modulate the system air resistance, which in turn changes the operation point on the fan curve. The dynamic wind simulator 100 may also include a pressure chamber (or airbox) 127 connected to the air inlet path 112 and/or the air outlet path 115. Referring to FIG. 2, the dynamic wind simulator 100 may include a test assembly or section (or reaction frame) 130 connected to the air inlet path 112 and/or the air outlet path 115 through jet ducting 133, which may be removable.

Figure 3:
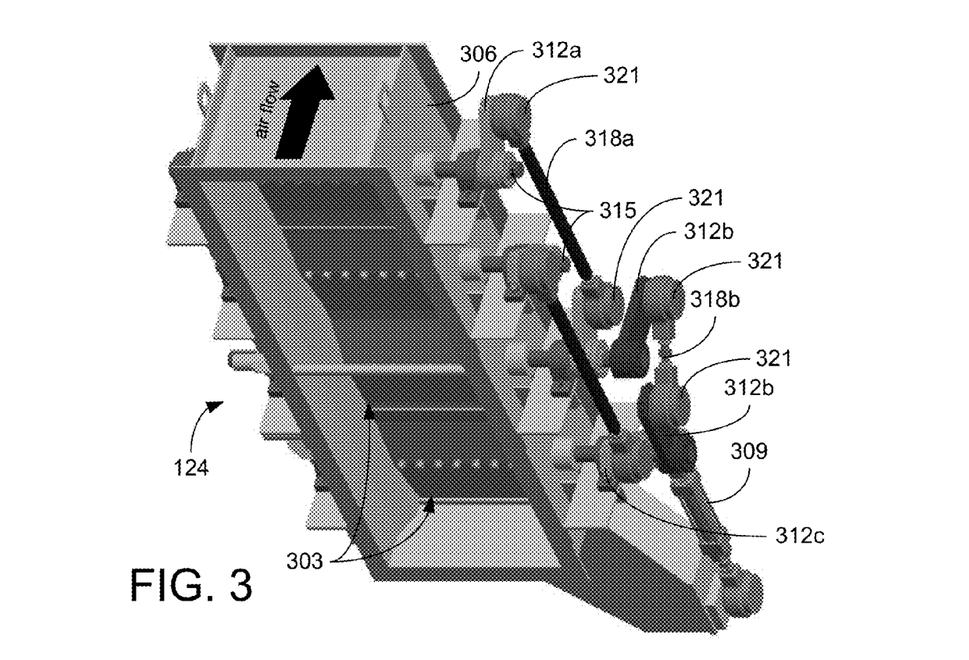
FIGS. 3-6 are illustrations of an example of a fast-acting damper of the dynamic wind simulator of FIG. 1 in accordance with various embodiments of the present disclosure.
Figure 4:
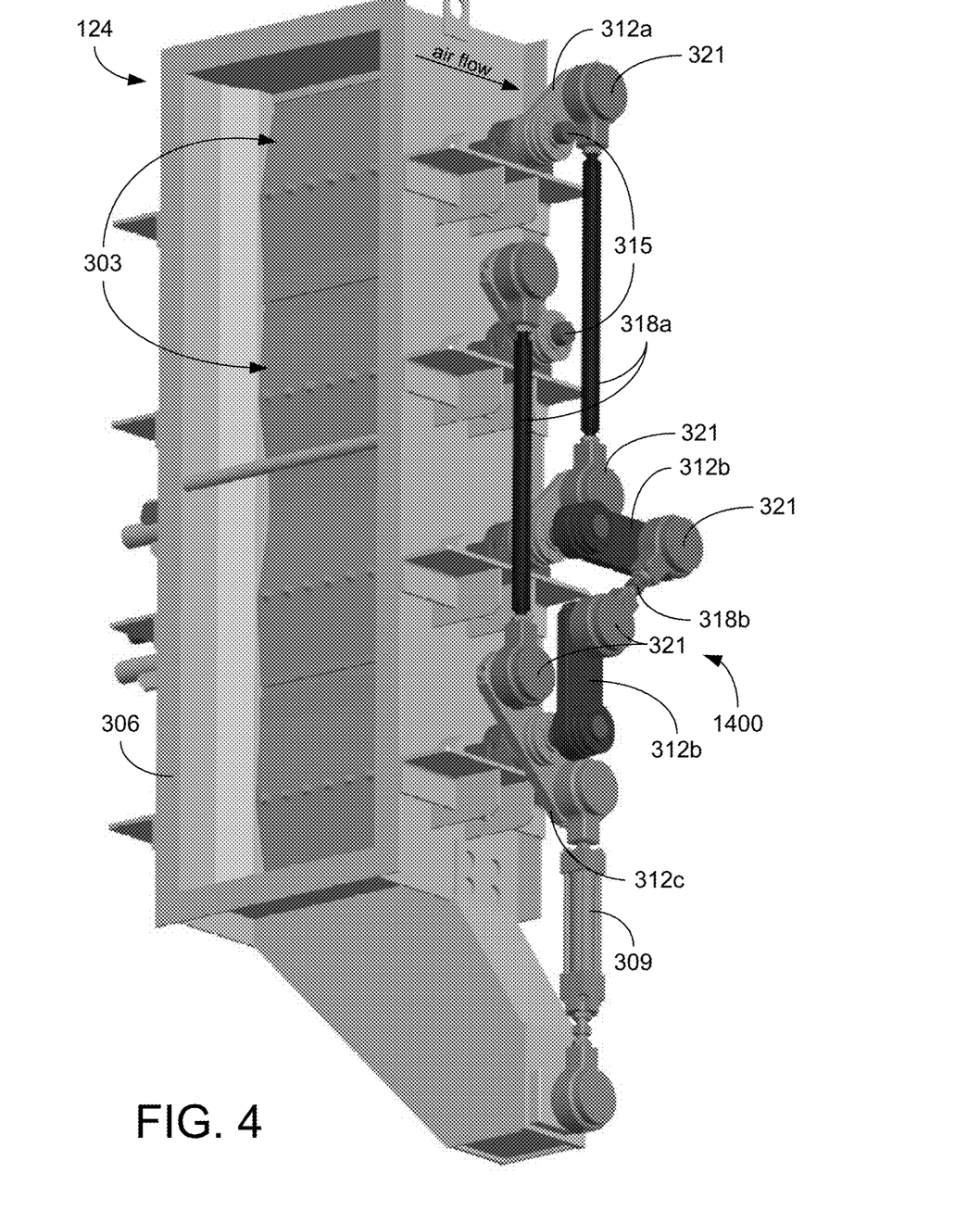
Figure 5:
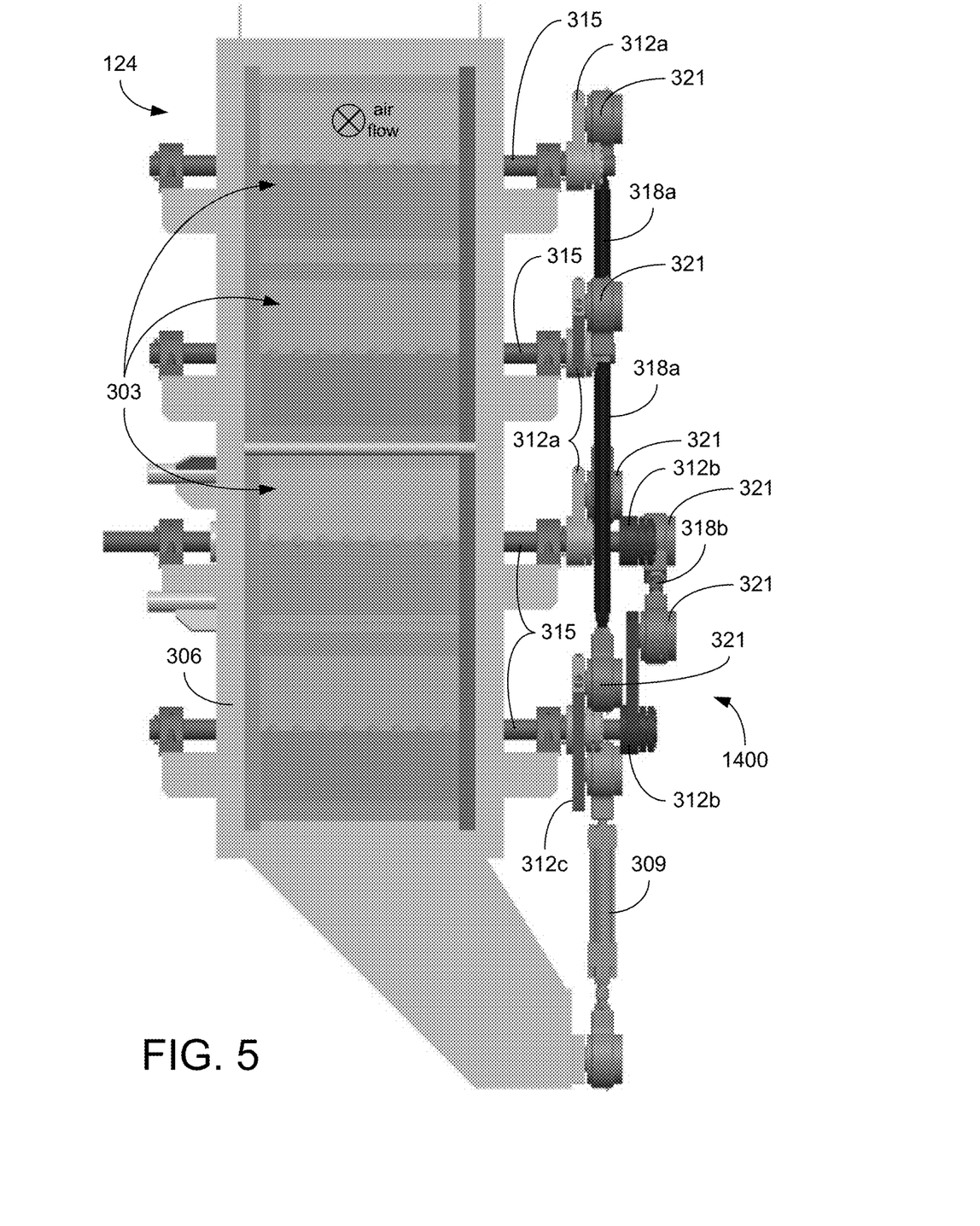
Figure 6:
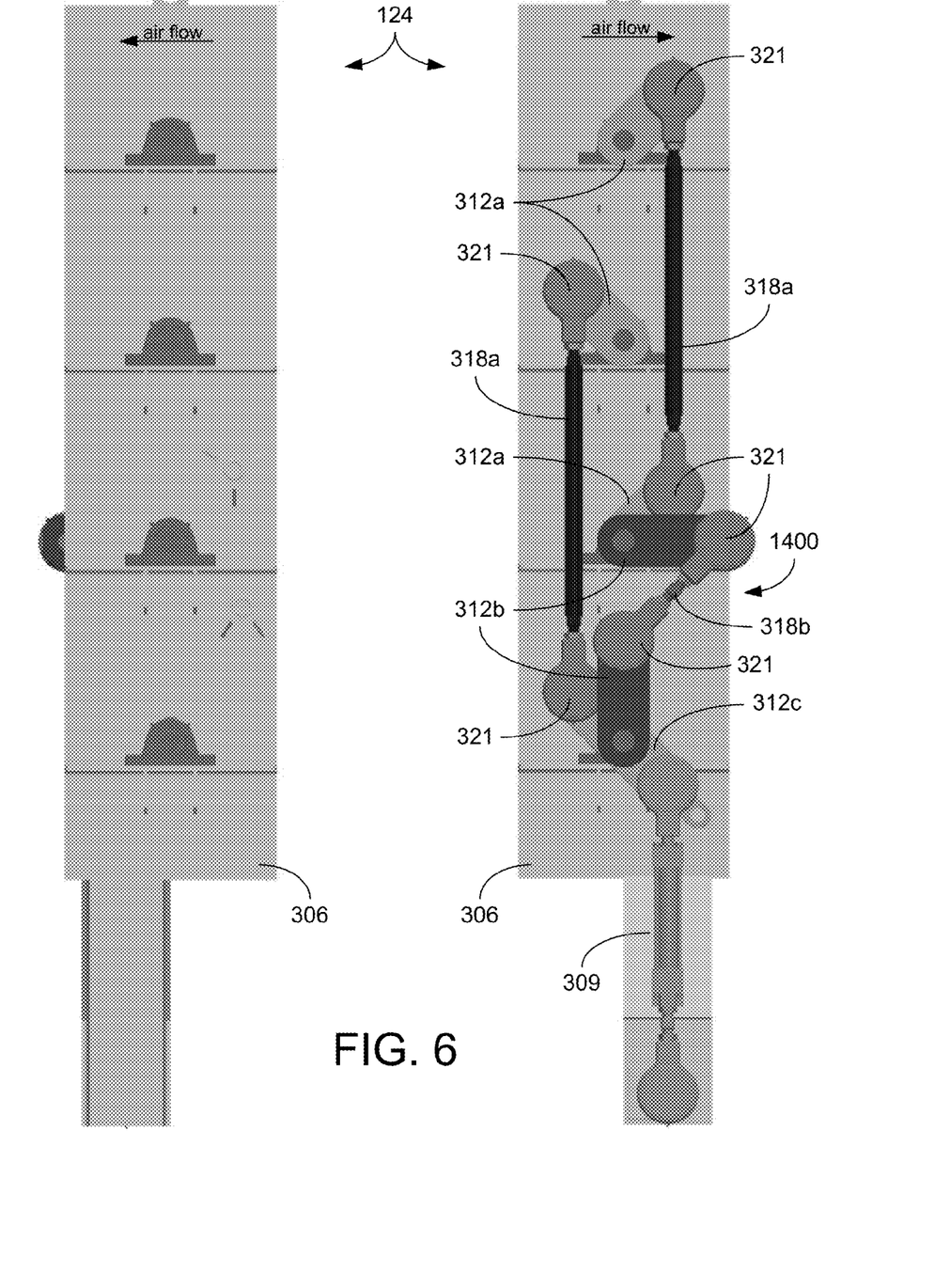

Referring to FIGS. 3-6, shown are various views of an example of a fast-acting damper 124. The fast-acting damper 124 is an opposed blade damper that is used to modulate the system air resistance. In the example of FIG. 3, the fast-acting damper 124 includes four opposed damper blades (or louvers) 303 that are mounted within a damper frame 306. The edges of the opposed damper blades 303 may overlap to restrict leakage airflow. Linear control can be achieved in the range of about 20% to 100% with overlapping damper blades 303. In other embodiments, the edges of the damper blades 303 may abut or touch each other without overlapping, which may allow for linear control over a larger operating range. A control loop feedback mechanism may modulate the setpoint (pressure or velocity) at an extremely high instruction rate to ensure that the desired effect is achieved. A command signal may be adjusted to the desired setpoint. In some cases, the command is a recording of the pressure variations to be applied to a test specimen. Sensors (e.g., pressure, flow, temperature, etc.) may be distributed throughout the dynamic wind simulator 100 to provide feedback for control and monitoring. For example, signals from two pressure sensors located in the pressure chamber 127 may be averaged to provide a feedback signal. Louver position may also be detected (e.g., using a sensor mounted on a louver shaft 315) and used as a feedback signal.

The fast-acting damper 124 is actuated by a hydraulic servo cylinder 309 operated by an analog PID (proportional-integral-derivative) controller. The hydraulic servo cylinder 309 positions the opposed damper blades 303 through parallel linkage paths to provide coordinated movement of the opposed damper blades 303. The fast-acting damper 124 may respond to a change in command pressure at about 10 Hz. Thus, the fast-acting damper 124 will be able to replicate any frequency wave form at or below 10 Hz, which is well above the upper limit of the frequency domain of the wind (pressure) spectra. If the louver blade 303 edges abut (are adjacent to or touching) each other when the fast-acting damper 124 is closed, then the position of individual louver blades 303 may be controlled. Separate servomotors may be attached to the louver shafts 315 and independently controlled.

Figure 7:
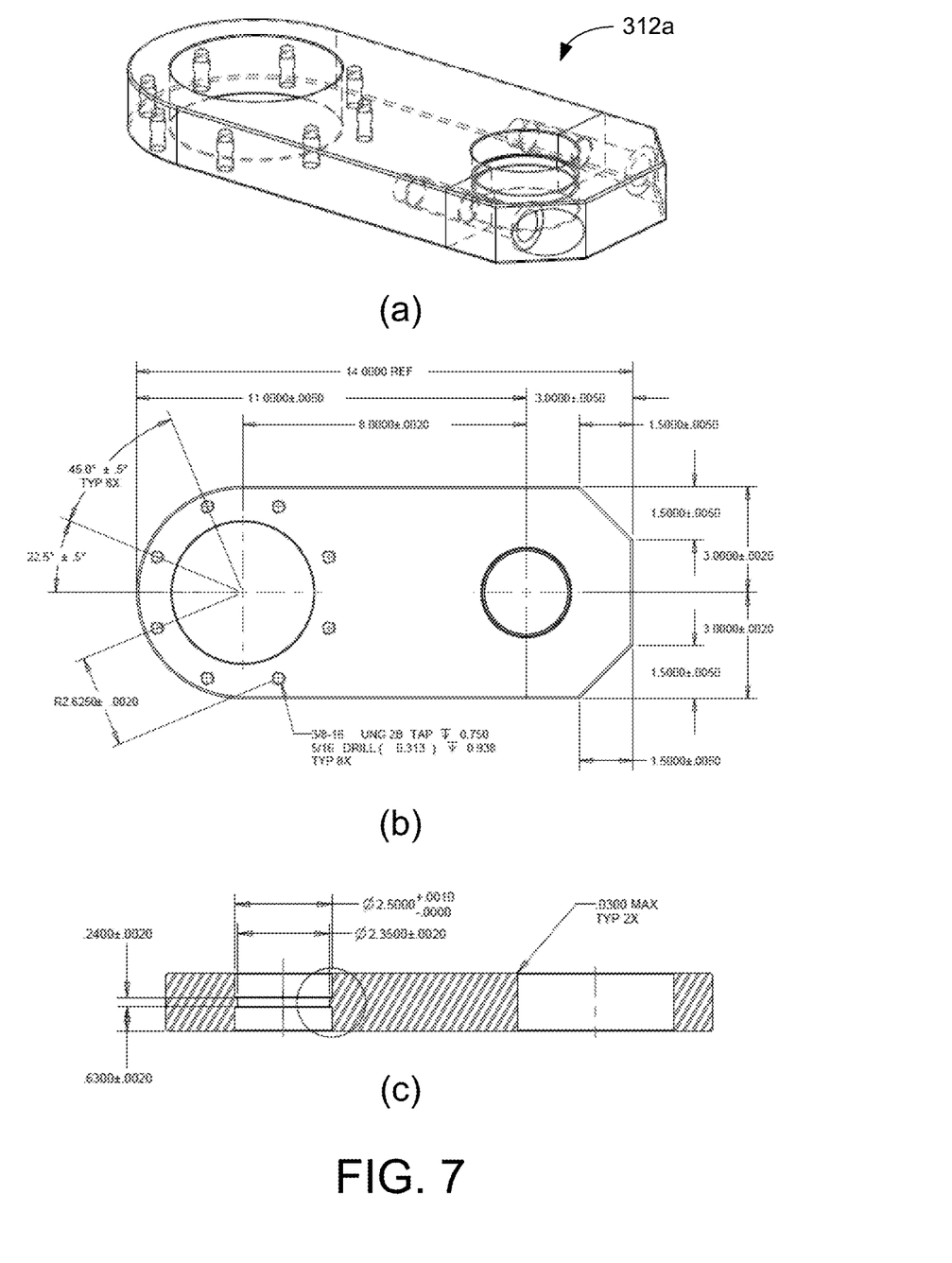
FIGS. 7-9 are illustrations of examples of louver arms of the fast-acting damper of FIGS. 3-6 in accordance with various embodiments of the present disclosure.
Figure 8:
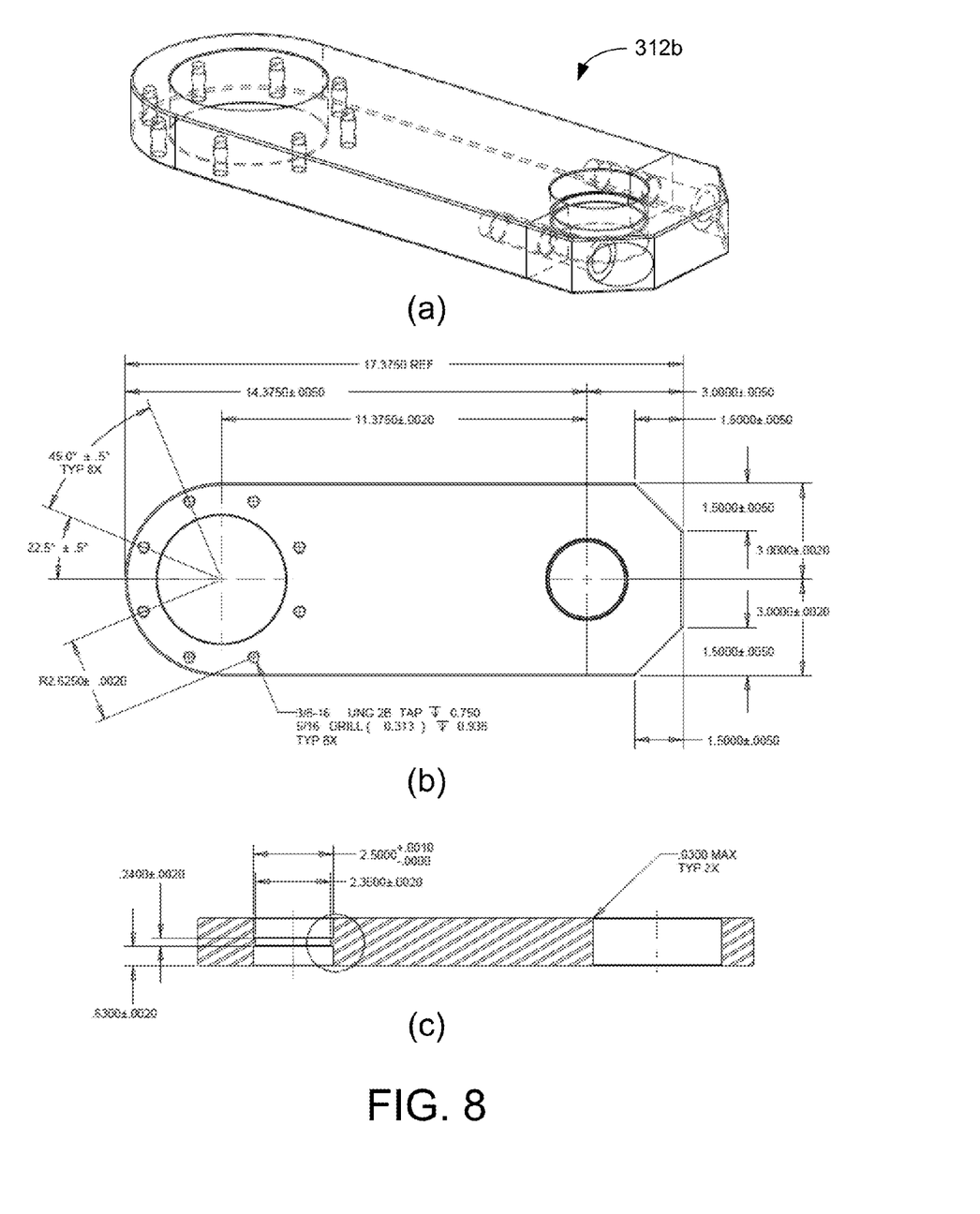
Figure 9:
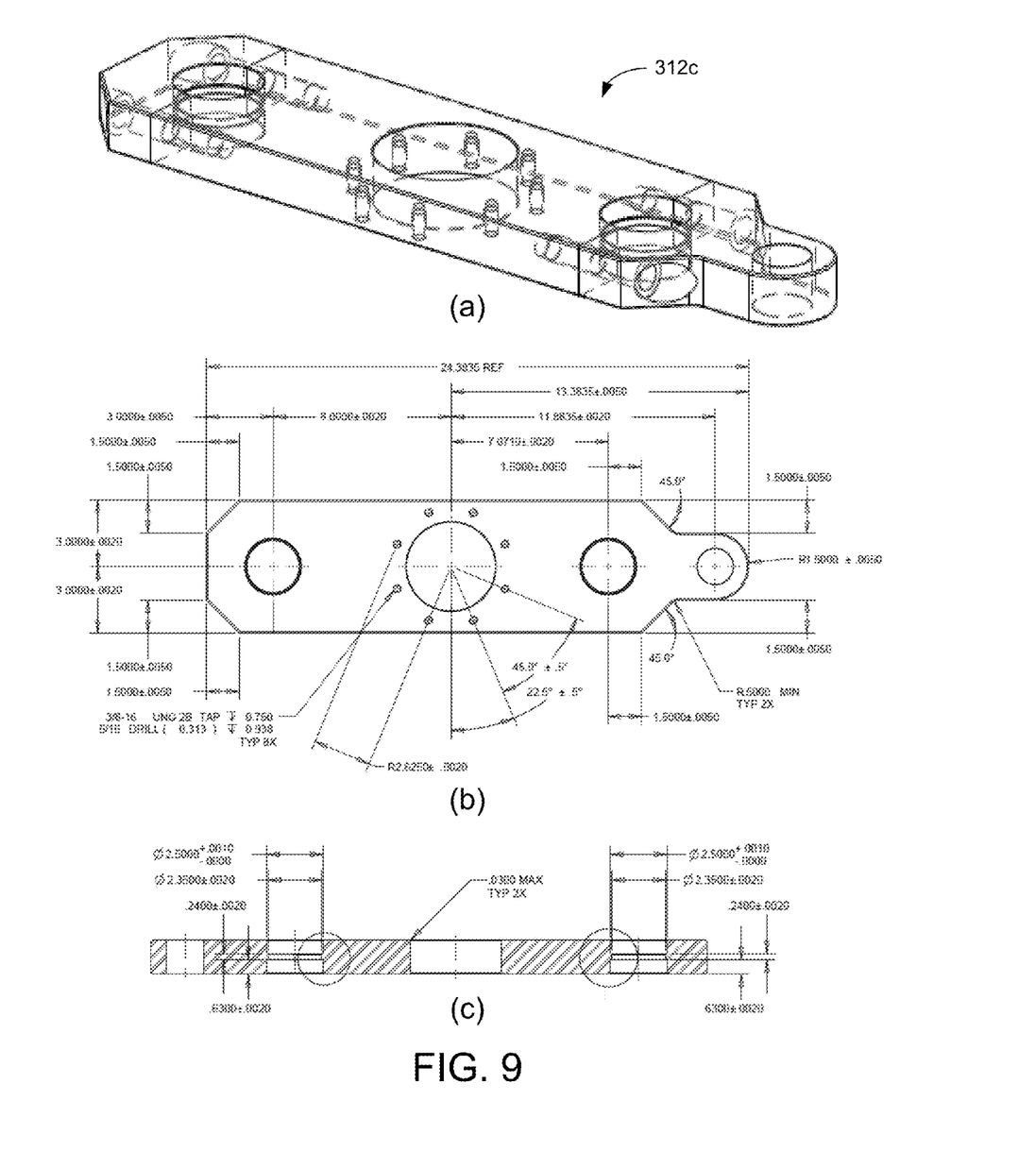

The fast-acting damper 124 is constructed to ensure smooth, fast operation. The fast-acting damper 124 includes louver arms 312 affixed to the shaft 315 of the damper blades 303. The louver arms 312 may be, e.g., 1.5 inch thick steel plate that is held in place by shrink discs that pass through an opening of the louver arm 312 before being tightened down on the louver shaft 315 and bolted to the louver arm 312. With an improved fit, the chance of the arms moving and/or becoming loose is reduced, providing for very stiff and accurate control of the fast-acting damper 124. FIGS. 7, 8, and 9 show (a) perspective views, (b) top views, and (c) cross-sectional views of examples of louver arms 312a, 312b, and 312c, respectively. The louver arms 312 include openings for connecting to a louver shaft 315 and to a push rod assembly. Louver arms 312a and 312c provide a lever action between the openings on 8 inch centers and louver arm 312b provides a lever action between the openings on 11.375 inch centers. Louver arm 312c also includes an opening to connecting to the hydraulic servo cylinder 309 (FIG. 6) and an opening (e.g., 1.75 inches) that allows a pin to lock the damper blades or louvers 303 in fully open or fully closed position while conducting repair or maintenance. A shrink disc in the center opening of the louver arm 312c is used to mount the control arm 312c to the louver shaft 315.

Figure 10:
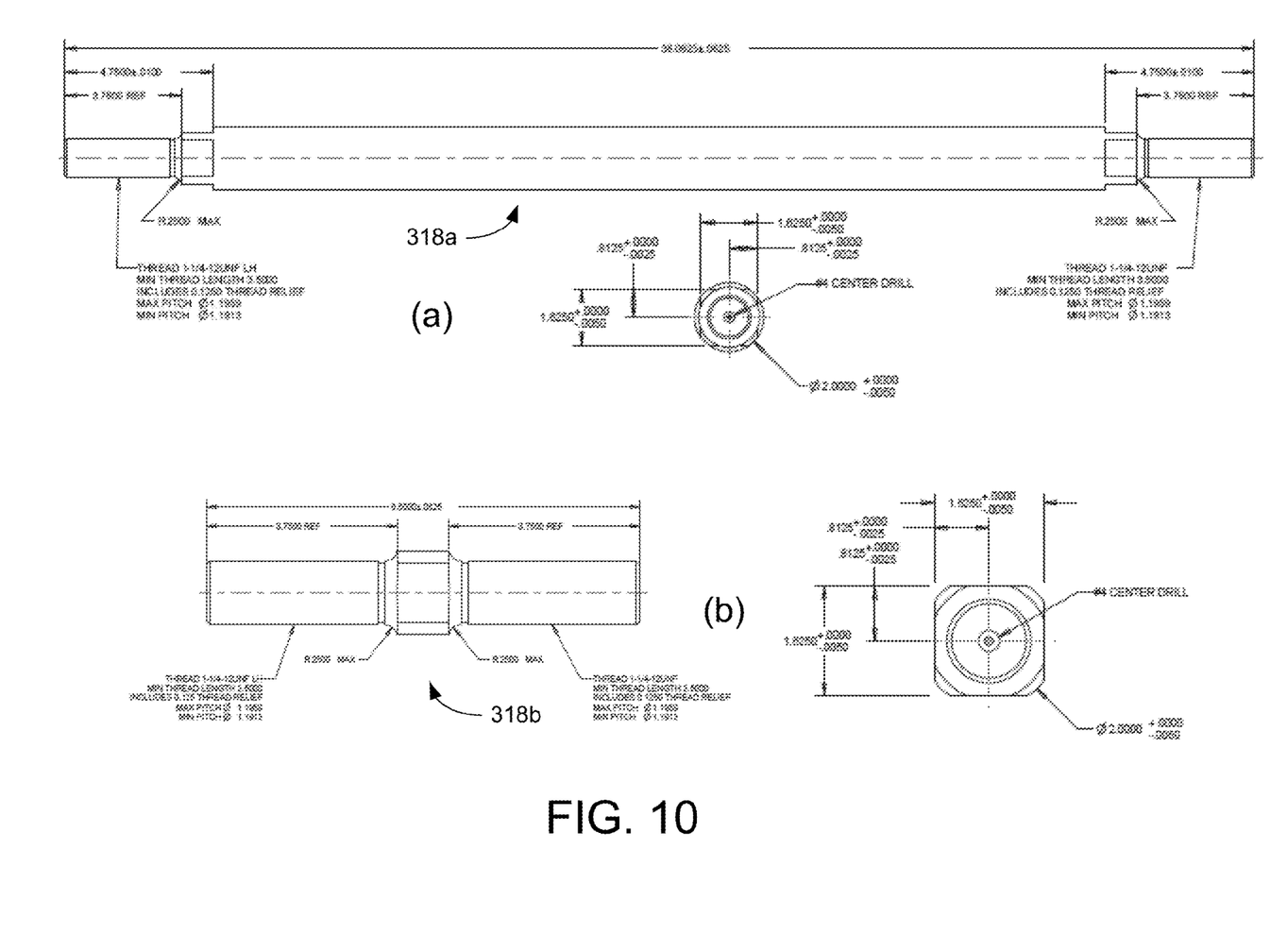
FIG. 10 includes illustrations of examples of push rods of the fast-acting damper of FIGS. 3-6 in accordance with various embodiments of the present disclosure.

Referring back to FIGS. 3-6, the louver arms 312 are interconnected by the push rod assemblies including a push rod 318 and rod end assemblies 321 that attach the ends of the push rods 318 to the louver arms 312. FIG. 10 illustrates side and end views of examples of (a) a long push rod 318a and (b) a short push rod 318b. The push rod 318 can be made of 2 inch stress proof steel with a 1.25 inch thread on each end. One end of the push rod 318 has a right hand thread and the other end of the push rod 318 has a left hand thread for ease of adjustment.

Figure 11:
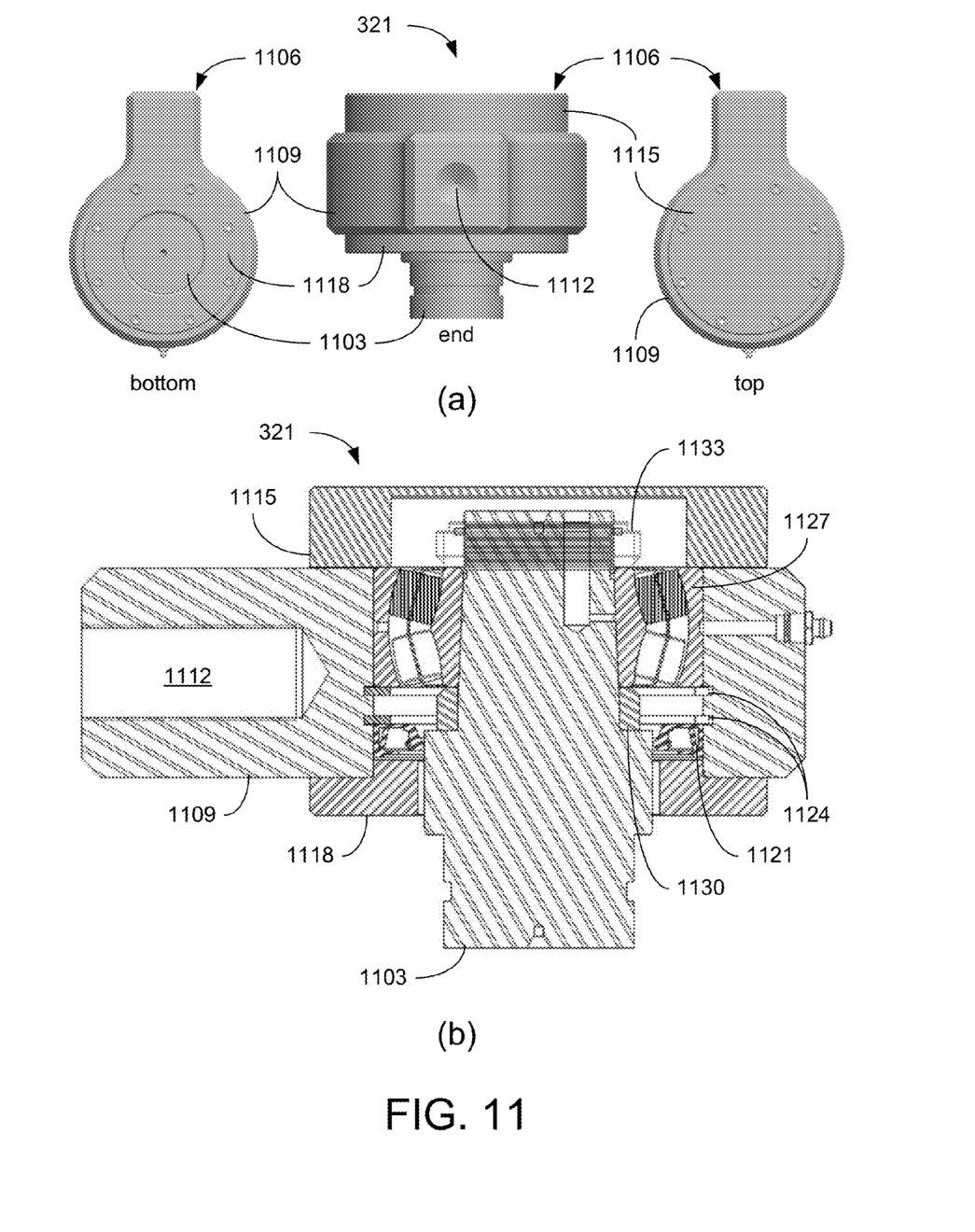
FIGS. 11-13 are illustrations of an example of a rod end assembly of the fast-acting damper of FIGS. 3-6 in accordance with various embodiments of the present disclosure.
Figure 12:
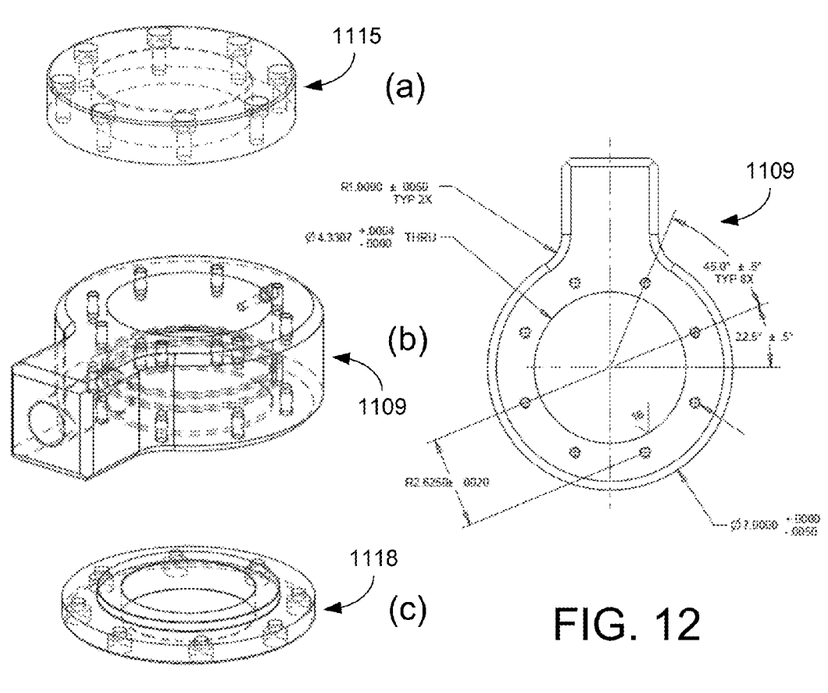

Referring to FIG. 11, shown are various views of an example of a rod end assembly 321. FIG. 11(a) provides bottom, end, and top views and FIG. 11(b) is a cutaway view of the rod end assembly 321. The rod end assembly 321 includes a hardened spindle 1103 inside a rod end housing 1106 that is attached to each end of the push rods 318 as illustrated in FIGS. 3-6. The rod end housing 1106 includes a housing 1109 with a threaded opening 1112, a housing cap 1115 and a housing plate 1118, seal 1121 and snap rings 1124 to hold a bearing 1127 and the seal 1121 in place. The use of the spherical bearing 1127 with a tapered inner bore provides high accuracy. For example, a SKF 22310 tapered bore spherical bearing with an inner diameter of 1.9685, outer diameter of 4.330 and a 1.5748 width may be utilized. The SKF 22310 bearing has a 39,600 lbf dynamic load and will handle the shock of opening and closing the louvers 303 while allowing for very smooth and controlled movement. Use of the snap rings 1124 allows for adjustment of the inner bore of the housing 1109 based upon the bearing size after preloading. FIG. 12 shows perspective views of (a) the housing cap 1115, (b) the housing 1109, and (c) the housing plate 1118 and a top view of the housing 1109. The housing 1109, housing cap 1115, and housing plate 1118 may be machined out of 17-4 stainless steel.

Figure 13:
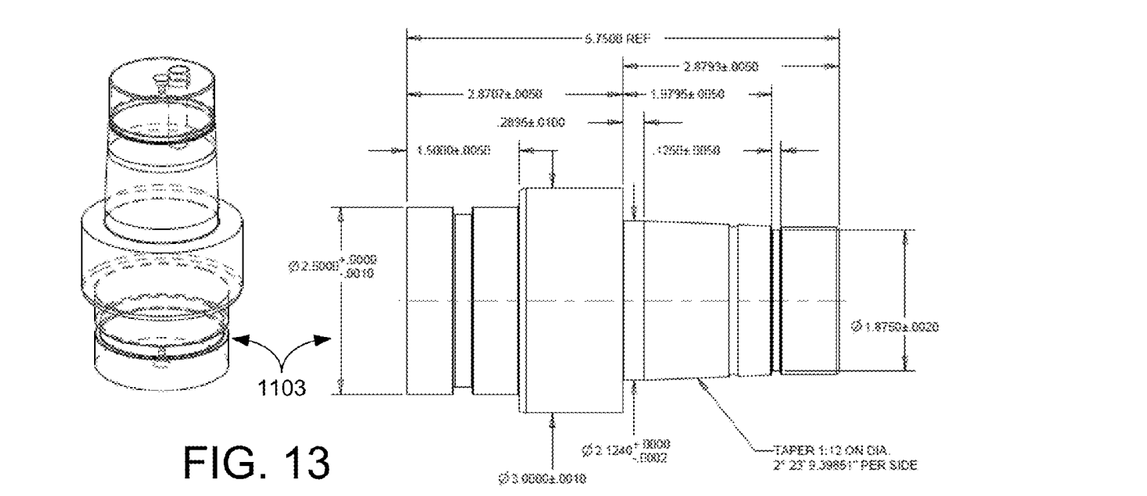

FIG. 13 shows a perspective view and a side view of an example of a hardened spindle 1103. As shown in FIG. 11(b), hardened spindles 1103 with, e.g., a 12:1 taper can be secured in the bearing 1127 of the rod end assembly 321 using a spacer 1130 and lock nut 1133 or other appropriate securing device. The spacer 1130 is sized for appropriate preloading of the bearing 1127. The lock nut 1133 also allows for preloading the bearing 1127. The hardened spindles 1103 are assembled in the louver arms 312 (FIGS. 3-8) on 8 inch and 11.375 inch centers to attach the push rods 318 to the louver arms 312 through the rod end assemblies 321. This type of application assures a tight fit and smooth operation of the blades or louvers 303 of the fast-acting damper 124.

Figure 14:
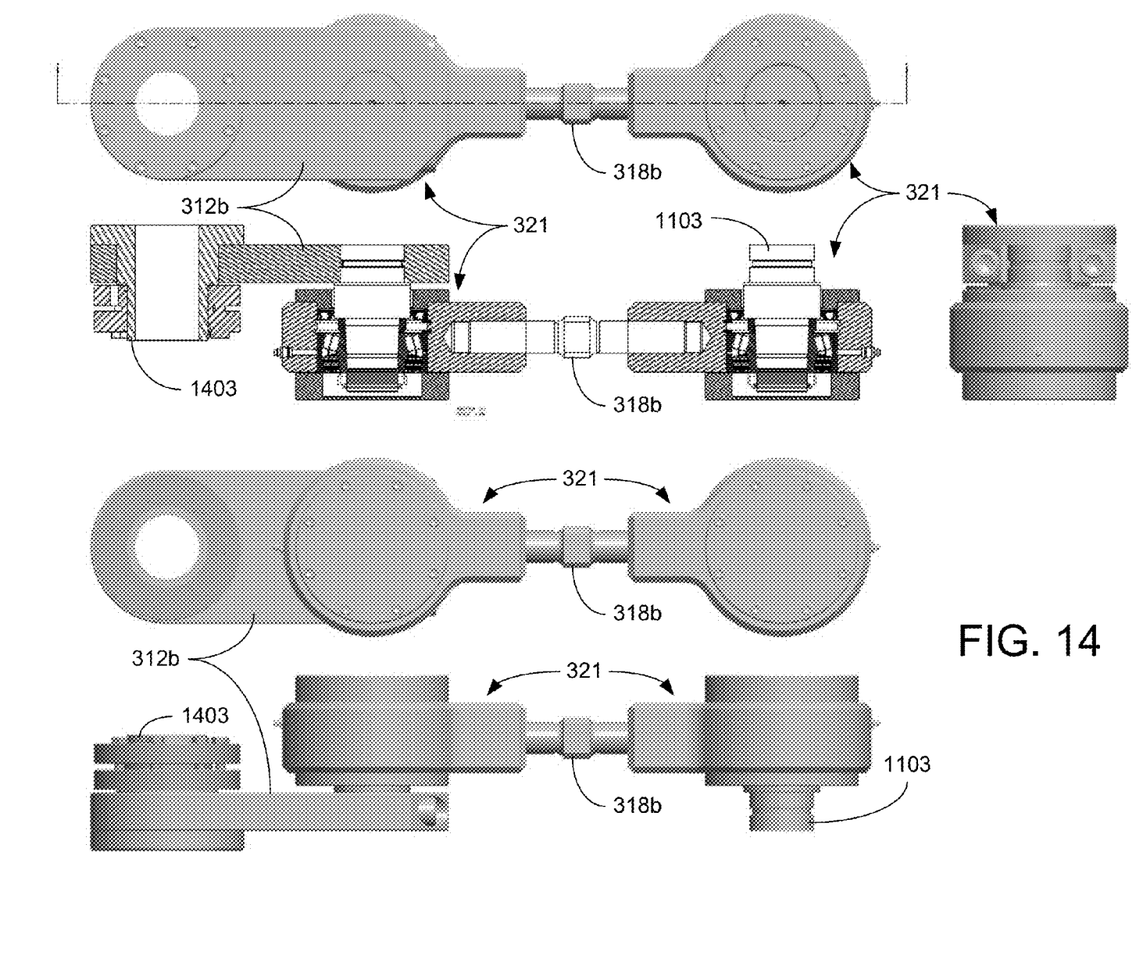
FIG. 14 includes illustrations of an example of an HLU heavy duty rotating ball joint of the fast-acting damper of FIGS. 3-6 in accordance with various embodiments of the present disclosure.

To achieve rapid movements of the fast-acting damper 124 (FIGS. 3-6), an HLU heavy duty rotating ball joint 1400 was designed to withstand high frequency reversing. FIG. 14 illustrates various views of an example of the HLU heavy duty rotating ball joint 1400. The HLU heavy duty rotating ball joint 1400 includes two rod end assemblies 321 connected together by a short push rod 318b. Hardened spindles 1103 of the rod end assemblies 321 are attached to louver arm 312b, which can be affixed to a louver shaft 315 by shrink discs 1403. The hardened spindles 1103 are secured to a bearing 1127 (FIG. 11) such as SKF 22310EK/VA759 spherical roller bearing with a dynamic load of 39,600 lbf. The straight bore design allows for each housing 1109 (FIGS. 11-12) to be sized to its individual bearing 1127 after the bearing 1127 is preloaded based upon the manufacture's design recommendation. The inner race of the bearing 1127 is driven up the 12:1 taper with a lock nut 1133 (FIG. 11) to preload the bearing 1127. The HLU joint 1400 uses a preloaded design to keep the ball joint 1400 in constant contact with the bearing surface, independent of the load direction, to achieve a zero tolerance. The housing plate 1118 (FIGS. 11-12) limits the off axis movement (spherical misalignment) of the bearing 1127 to two degrees, which is a design maximum. The two degree maximum "tilt" also prevents the rod end assemblies 321 from twisting to the point that they interfere with each other when rod end assemblies 321 are driving louver arms 312 on the same louver shaft 315.

Components of the HLU heavy duty rotating ball joint 1400 may be machined from hardened 17-4 stainless steel. The robust design of the rod end assembly 321 protects the internal workings. The housing cap 1115 keeps foreign materials from infiltrating the bearings 1127. The overall design of the HLU heavy duty rotating ball joint 1400 allows maintenance on a single rod end assembly 321 to be carried out without a complete disassembly.

The dynamic wind simulator 100 provides the ability to recreate time-varying wind and wind loading conditions. The dynamic wind simulator 100 to evaluate and test components by operating in two modes. First, a pressure simulation mode allows dynamic wind pressure to be applied to large wall cladding and component systems, such as a commercial rolling door or a wall on a metal building. The dynamic wind simulator 100 can also apply static (steady) and pulsating pressure conditions by controlling the fast-acting damper 124 (FIG. 1). Second, a velocity simulation allows turbulent airflow conditions to be applied such as, e.g., over a roof deck are simulated to load discontinuous roof systems (e.g., tile The dynamic wind simulator 100 is capable of subjecting a building system to an entire hurricane episode in order to replace or reduce the need for simple diagnostic tools, such as building product approval tests adapted from ASTM procedures. The dynamic wind simulator 100 can replicate naturally-occurring wind velocity and pressure patterns in a controlled laboratory environment. For example, if a pressure sensor recorded high-fidelity data on the wall of a commercial building in Homestead, Fla. during Hurricane Andrew, the Simulator could "replay" the pressure sequence in its entirety, then the dynamic wind simulator 100 can artificially applied the measured loading in a way that would be virtually indistinguishable.

Figure 15:
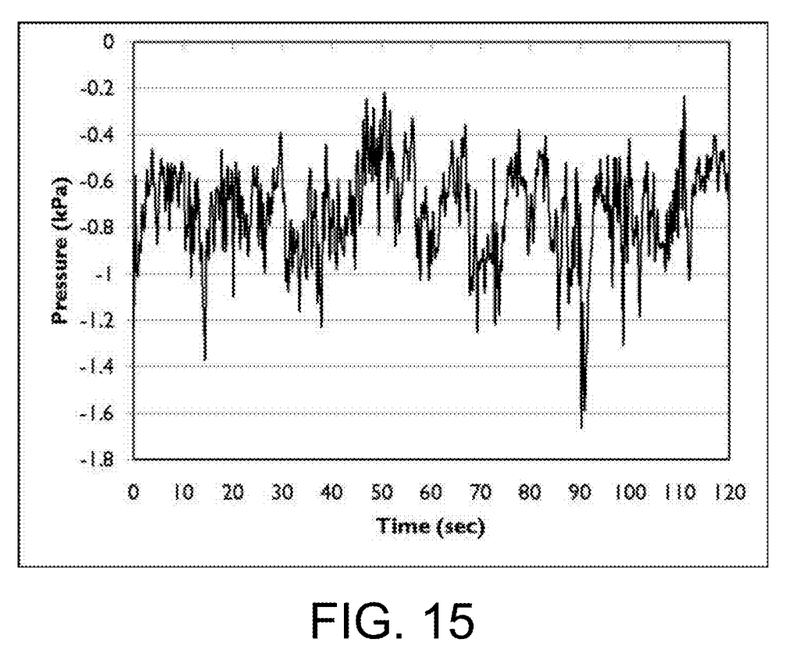
FIG. 15 a plot illustrating time-varying pressure produced by the dynamic wind simulator of FIG. 1 in accordance with various embodiments of the present disclosure.

An analog computer (or controller) sends commands to an analog servo amplifier that actuates a servo valve driving a hydraulic cylinder 309 (FIGS. 3-6) to operate the fast-acting damper 124 (FIG. 1). For practical purposes, this process can be assumed to occur at near the speed of light because only analog feedback/control is implemented (i.e., no analog-to-digital or digital-to-analog conversion occurs). Thus, it is possible to simulate a time-varying pressure such as the sample sequence shown in FIG. 15, which was taken from a wind tunnel experiment. It is noted that only two minutes of data is shown to illustrate the naturally occurring high frequency fluctuations in the load sequence; however the system can operate for much longer. In addition, while the example of FIG. 15 illustrates operation in a range of about zero to −1.8 kPA, the dynamic wind simulator 100 can produce pressure variations in the range of ±23 kPa. The machine was designed to be operated continuously at least 12 hours to recreate an entire hurricane passage (e.g., approach, landfall and inland transition) based upon a predefined variation in pressure and/or velocity.

Figure 16:
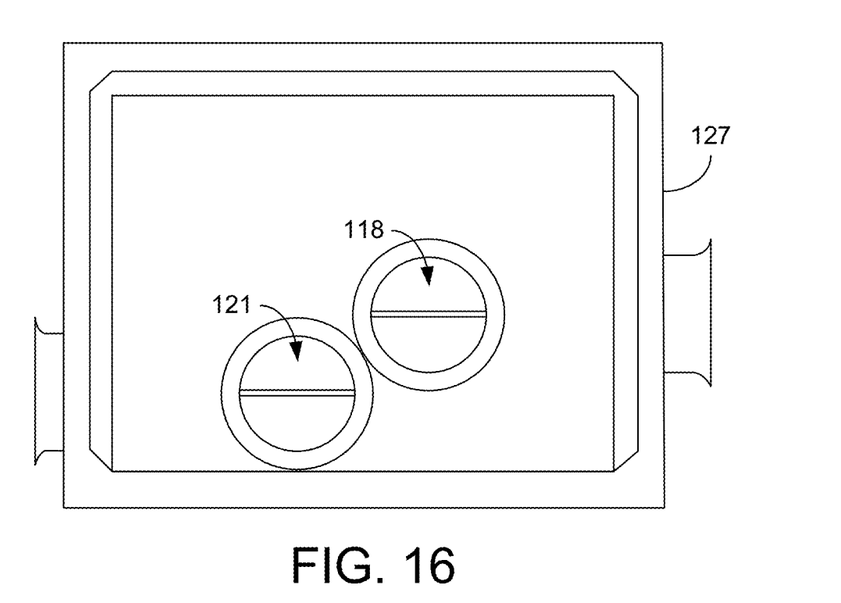
FIG. 16 is a graphical representation of the pressure chamber (or airbox) of the dynamic wind simulator of FIG. 1 in accordance with various embodiments of the present disclosure.

During pressure simulation a pressure chamber (or airbox) 127 of FIG. 1 may be utilized. FIG. 16 provides an end view illustrating the open end of the pressure chamber 127. The air inlet path 112 and air outlet path 115 are connected to the pressure chamber 127 as illustrated in FIG. 1 and airflow to/from the pressure chamber 127 is controlled by positioning the inlet and outlet dampers 118 and 121. For example, the test specimen (e.g., a rolling door, wall assembly, or other structural component) can mounted into a steel frame that is clamped to the open side of the pressure chamber (or airbox) 127, effectively closing the box. Air may then be forced into the pressure chamber 127 through outlet damper 121*a* to increase the pressure. The air introduced into the pressure chamber 127 increases the pressure if the airflow rate into the pressure chamber 127 exceeds the flow rate out of the pressure chamber 127 through the inlet damper 118*b* plus the leakage through the attached specimen. The rate of air supply is modulated by the fast-acting damper 124 (FIG. 1), which is upstream of the centrifugal fan 103 (FIG. 1). Closing the fast-acting damper 124 increases the system resistance, which in turn causes the centrifugal fan to produce more static pressure and less airflow. When the fast-acting damper 124 is opened, the opposite occurs. These actions cause a corresponding change in the pressure acting on the specimen because the mass flow rate in/out of the pressure chamber 127 changes. Conversely, air may be removed from the pressure chamber 127 through inlet damper 118*b* to reduce the pressure in the pressure chamber 127. The air removed from the pressure chamber 127 decreases the pressure, which may result in a negative pressure in the pressure chamber 127, if the airflow rate out of the pressure chamber 127 exceeds the flow rate into the pressure chamber 127 through the outlet damper 121*a* plus the leakage through the attached specimen. Duct sizes may be used to reduce the velocity of the airflow entering the pressure chamber 127. For example, the ducting may be sized to limit the airflow to 5000 feet per minute. In some embodiments, a baffle or cover may be included over the inlet and outlet openings of the pressure chamber 127 to redirect airflow and more evenly apply pressure. Pressure can be measured inside the pressure chamber and the fast-acting damper 124 position may be adjusted to achieve the desired setpoint.

After mounting the test specimen, testing may be carried out over static or variable test conditions. For example, a control recording for a variable test may be characterized as large pressure pulses (e.g., up to 400 lbs/sq ft) at a low frequency (e.g., about 0.3 Hertz) decreasing continuously to about 10 lbs/sq. ft. at about 10 Hz. In order to provide these pressure variations, the fan 103 (FIG. 1) provides airflow in proportion to the rate of change of pressure in the pressure chamber (or airbox) 127 volume, airflow in proportion to the flexing of the test specimen, makeup airflow for the leakage through the test specimen, and additional pressure to accelerate the air through the ducting. The volume of the pressure chamber 127 may be marginally larger than the expected flex of the test specimen to allow for improved airflow and/or pressure control. Using measurements and characteristics of the dynamic wind simulator 100 and the test specimen, the load locus of the test may be determined and mapped onto the operating characteristics of the fan 103.

The inputs to the control can include the pressure command (control recording), the pressure feedback from the pressure chamber 127, and the position of the louvers 303 of the fast-acting damper 124. These inputs are all provided as analog signals, that is, a voltage proportional to the physical attribute they represent. The output is a current command to a servo valve that controls the hydraulic servo cylinder 309 (FIGS. 3-6) operating the louvers 303 (FIGS. 3-6) of the fast-acting damper 124. Pressure feedback may be provided by transducers located in the pressure chamber 127. The signals from two or more transducers located at different positions in the pressure chamber 127 may be averaged. In some cases, disparate measurements can be checked and initiate a warning.

The pressure feedback plus a calculated rate of change of pressure signal are compared to the modified command to generate an error signal. The error signal is provided to both an integrator and a proportional amplifier. The integrator gain is adjustable, but the midpoint is set to coincide with the fan output characteristics. That is, the amplitude of the integral and proportional amplifiers will be the same at the frequency where the relationship between the louver 303 position and the pressure stops being proportional and becomes integral. This will result in large DC gain with minimal (or virtually no) static error.

The amplified proportional error plus the integral error becomes the command to the servo valve position. It is compared to the signal from the transducer monitoring the position of the louvers 303 and the resultant louver error is amplified. A low frequency (e.g., about 0.5 Hz) integrator acts in parallel with a proportional amplifier to eliminate the static error. The proportional amplifier has a lag frequency of about 125 Hz in order to compensate for resonance due to interaction of the inertia of the servo valve and the compliance of the hydraulic servo cylinder 309. The resultant voltage signal is converted to a current signal that is limited to the rated current of the servo valve.

The speed of the hydraulic servo cylinder 309 (and thus the fast-acting damper 124) is roughly proportional to the input current to the servo valve. Therefore, the further the hydraulic servo cylinder 309 is from the commanded position, the faster it will travel. As the louver error approaches zero, so does the actuation speed. The control is expected to be able to maintain a 1:1 relationship between the input and output up to 10 Hz. The control is, by design, set to decline proportionately above 3 Hz, e.g., half as much at 6 Hz. For this reason, from about 3 Hz up to about 20 Hz, the command to the servo valve position will be increased proportionately, e.g., doubled at 6 Hz. The rate of change of pressure is scaled to equal the pressure signal at 3 Hz.

The dynamic wind simulator 100 is designed to provide an average pressure of ±50 psf and a maximum pressure of ±460 psf and will respond to a change in command pressure at a frequency of 10 Hz. The dynamic wind simulator 100 is also designed to simulate pressures on porous systems. At peak pressure, the fan 103 (FIG. 1) can compensate for 100,000 cfm of leakage through a test specimen.

In the velocity simulation mode, the inlet and outlet dampers 118*b* and 121*a* are shut off to isolate the pressure chamber 127 and allow air to pass directly from the exterior intake to the exterior exhaust. The dynamic wind simulator 100 exhausts into the jet ducting 133 of FIG. 2, which is connected for the velocity testing. Air passes through a settling chamber 136 to reduce the incoming turbulence, then contracts into a high speed jet that passes through a test section 130. The bottom part of the test section 130 may be removable to accommodate roof samples such as, e.g., a shingle roof mockup. The rate of flow can be modulated by the fast-acting damper 124. In the velocity simulation mode, the dynamic wind simulator 100 acts a high powered air jet that can rapidly change velocity under the direction of the analog computer system.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A dynamic wind simulator, comprising:
a fan comprising a fan inlet and a fan discharge, the fan inlet connected to a proximal end of a fan inlet duct; and
an opposed blade damper connected to a distal end of the fan inlet duct, the opposed blade damper comprising pairs of opposed damper blades that include a first damper blade configured to rotate in a first direction and a second damper blade configured to rotate in a second direction opposite the first direction, where the opposed blade damper is configured to modulate airflow pressure or velocity provided by the fan discharge at frequencies up to 10 Hz, the air flow pressure or velocity modulated by adjusting positioning of the pairs of opposed damper blades.

2. The dynamic wind simulator of claim 1, wherein positioning of the pairs of opposed damper blades is adjusted by a hydraulic servo cylinder through a first linkage path coupled to the first damper blade of each of the pairs of opposed damper blades and a second linkage path coupled to the second damper blade of each of the pairs of opposed damper blades, the second linkage path offset from and in parallel with the first linkage path.

3. The dynamic wind simulator of claim 2, wherein the hydraulic servo cylinder is controlled by an analog PID controller.

4. The dynamic wind simulator of claim 3, wherein the analog PID controller controls the opposed blade damper to produce a predefined variation in airflow velocity.

5. The dynamic wind simulator of claim 4, wherein the predefined variation in airflow velocity simulates air velocity of a hurricane.

6. The dynamic wind simulator of claim 2, wherein the first and second linkage paths are connected through a rotating ball joint including a spherical roller bearing, the rotating ball joint configured to restrict off axis movement of the spherical roller bearing to two degrees.

7. The dynamic wind simulator of claim 6, wherein the rotating ball joint preloads the spherical roller bearing to achieve zero tolerance.

8. The dynamic wind simulator of claim 2, wherein the first linkage path includes louver arms affixed to corresponding shafts of the first damper blades, each louver arm of the first linkage path connected to at least one other louver arm of the first linkage path through a push rod assembly of the first linkage path, and the second linkage path includes louver arms affixed to corresponding shafts of the second damper blades, each louver arm of the second linkage path connected to at least one other louver arm of the second linkage path through a push rod assembly of the second linkage path.

9. The dynamic wind simulator of claim 8, wherein the push rod assembly of the first linkage path and the push rod assembly of the second linkage path include rod end assemblies attached to each end of a push rod, the rod end assemblies including a hardened spindle for attachment inside rod end housings attached to the louver arms.

10. The dynamic wind simulator of claim 1, further comprising:
an air inlet path including the opposed blade damper and the fan inlet duct, the air inlet path further including a plurality of inlet openings having corresponding inlet dampers that are positioned to adjust airflow from the inlet openings to the opposed blade damper; and
an air outlet path including a plurality of outlet openings having corresponding outlet dampers that are positioned to adjust airflow from the fan discharge to corresponding outlet openings.

11. The dynamic wind simulator of claim 10, further comprising a pressure chamber attached to a first one of the plurality of inlet openings of the air inlet path and a first one of the plurality of outlet openings of the air outlet path.

12. The dynamic wind simulator of claim 11, wherein the opposed blade damper is continuously adjusted to produce a time varying pressure in the pressure chamber.

13. The dynamic wind simulator of claim 10, further comprising a test section attached to a single outlet opening of the plurality of outlet openings of the air outlet path.

14. The dynamic wind simulator of claim 13, wherein the opposed blade damper is continuously adjusted to produce a time varying airflow velocity in the test section.

15. A system, comprising:
a fan having a fan inlet coupled to a fan inlet duct and a fan discharge coupled to a fan outlet duct;
an air outlet path of the fan, the air outlet path comprising the fan outlet duct connected to a testing assembly configured to support a specimen for testing; and
an air inlet path of the fan, the air inlet path comprising:
an opposed blade damper coupled to the fan inlet duct, the opposed blade damper configured to modulate airflow pressure or velocity provided by the fan to the testing assembly at frequencies up to 10 Hz;
a damper inlet duct coupled to the opposed blade damper opposite the fan inlet duct, the damper inlet duct including an inlet damper configured to adjust airflow from an inlet opening of the damper inlet duct to the opposed blade damper.

16. The system of claim 15, wherein the testing assembly comprises a pressure chamber configured for pressure testing the specimen, and where the opposed blade damper is continuously adjusted to produce a time varying pressure in the pressure chamber.

17. The system of claim 16, wherein the pressure chamber is further coupled to the air inlet path via the inlet opening of the damper inlet duct.

18. The system of claim 15, wherein the testing assembly comprises a test section configured for wind testing the specimen and the opposed blade damper is continuously adjusted to produce a time varying airflow velocity in the test section.

19. The system of claim 18, wherein the testing assembly further comprises a settling chamber configured to reduce turbulence in the airflow provided to the test section.

20. The system of claim 15, further comprising an analog controller configured to control the opposed blade damper to produce a predefined variation in the airflow.

* * * * *